(12) United States Patent
Merighi

(10) Patent No.: US 12,398,001 B2
(45) Date of Patent: Aug. 26, 2025

(54) DEVICE FOR THE TRANSPORT OF CERAMIC SLABS

(71) Applicant: SYSTEM CERAMICS S.P.A., FIORANO MODENESE (IT)

(72) Inventor: Enrico Merighi, Castelvetro (IT)

(73) Assignee: SYSTEM CERAMICS S.P.A., Fiorano Modenese (IT)

(*) Notice: Subject to any disclaimer, the term of this patent is extended or adjusted under 35 U.S.C. 154(b) by 76 days.

(21) Appl. No.: 18/262,258

(22) PCT Filed: Mar. 1, 2022

(86) PCT No.: PCT/IB2022/051767
§ 371 (c)(1),
(2) Date: Jul. 20, 2023

(87) PCT Pub. No.: WO2022/185188
PCT Pub. Date: Sep. 9, 2022

(65) Prior Publication Data
US 2024/0308786 A1    Sep. 19, 2024

(30) Foreign Application Priority Data

Mar. 2, 2021   (IT) .................. 102021000004889

(51) Int. Cl.
*B65G 49/06*    (2006.01)
*B65G 15/12*    (2006.01)
*B65G 21/12*    (2006.01)

(52) U.S. Cl.
CPC ............. *B65G 49/06* (2013.01); *B65G 15/12* (2013.01); *B65G 21/12* (2013.01); *B65G 2201/022* (2013.01)

(58) Field of Classification Search
CPC ...... B65G 49/06; B65G 15/12; B65G 15/105; B65G 21/12; B65G 2201/022; B65G 15/10; B65G 41/003
(Continued)

(56) References Cited

U.S. PATENT DOCUMENTS 6,032,788 A * 3/2000 Smithers ............ H05K 13/0069
198/817
6,688,458 B2 * 2/2004 Prentice ................. B65G 21/10
198/817

(Continued)

FOREIGN PATENT DOCUMENTS

CN      111502210      8/2020
JP      S59143806      8/1984

OTHER PUBLICATIONS

International Search Report, issued May 31, 2022, 12 pages.

*Primary Examiner* — Mark A Deuble
(74) *Attorney, Agent, or Firm* — Chrisman Gallo Tochtrop LLC

(57) ABSTRACT

A device for the transport of ceramic slabs (L), comprising:
a pair of inner belts (2,3) and a pair of outer belts (4,5), parallel to the transport direction (x) and coplanar to a transport plane;
wherein each belt is associated to respective supports (210,220,310,320,410,420,510,520);
at least the front supports (210,310,410,510) are slidably associated to a front bar (6), arranged perpendicular to a transport direction (X) and parallel to the transport plane;
a motor means, predisposed to activate the front bar (6) in rotation, so as to displace the front supports (210,310,
(Continued)

410,510) along the front bar (6), in a perpendicular direction to the transport direction (X) and parallel to the transport plane.

11 Claims, 4 Drawing Sheets

(58) Field of Classification Search
USPC .......................................................... 198/817
See application file for complete search history.

(56) References Cited

U.S. PATENT DOCUMENTS

| | | | | |
|---|---|---|---|---|
| 7,810,635 B2* | 10/2010 | Kim | ................ | H01L 21/67766 |
| | | | | 198/465.1 |
| 7,909,159 B1* | 3/2011 | Zats | ...................... | B65G 21/10 |
| | | | | 198/606 |
| 8,047,756 B2* | 11/2011 | Tuffs | ...................... | B66F 9/063 |
| | | | | 198/463.3 |
| 10,081,493 B2* | 9/2018 | Günther | ................ | B65G 15/14 |
| 10,589,953 B2* | 3/2020 | Allen, Jr. | ............... | B65H 29/16 |
| 2005/0109588 A1* | 5/2005 | Gariglio | ............... | B65G 49/064 |
| | | | | 198/689.1 |
| 2009/0174138 A1 | 7/2009 | Abe | | |
| 2013/0220777 A1 | 8/2013 | Mauger et al. | | |

* cited by examiner

DEVICE FOR THE TRANSPORT OF CERAMIC SLABS

The present invention relates to a device for the transport of ceramic slabs.

In the field of the ceramic industry transport devices are widely used comprising one or two pairs of motorised belts, arranged parallel and coplanar so as to define a horizontal transport plane. Such transport devices are used in many steps of the production process, to take the ceramic slabs from one processing step to the next step. The slabs are positioned on motorised belts, in a substantially barycentric position with respect thereto.

In many cases, the distance separating the various motorised belts can be adjusted, using relevant regulation mechanisms, to adapt the width of the transport plane to the dimensions of the slabs.

The evolution of production techniques in the ceramics industry now enables slabs of much larger dimensions to be produced with respect to the more traditional dimensions that can be obtained with less evolved processes. Therefore it often happens that a same production line is called upon to make slabs of different dimensions, from the smaller and more traditional formats to the larger formats.

Current transport devices are not able to adapt effectively to all the slab formats that can be made with modern production lines. The adjustment of the distance separating the belts, especially in the case of slab with larger formats, changes the position of the support areas of the slabs themselves, which often have large unsupported sections or that project in a cantilever fashion from the transport plane. This can cause deformation of the slabs themselves, which bend due to the effect of their own weight, especially during the steps of the process prior to firing.

The object of the present invention is to provide a device for the transport of ceramic slabs that enables the drawbacks of the currently available transport devices to be obviated.

The main advantage of the transport device according to the present invention is that it can effectively adapt to the transport of slabs of different dimensions, still offering a balanced and barycentric support which prevents the deformation of the slabs themselves.

Additional features and advantages of the present invention will become more apparent from the following detailed description of an embodiment of the invention, illustrated by way of non-limiting example in the appended figures, in which:

FIG. 1a shows a side view of the transport device according to the present invention (from the bottom of FIG. 1);

Figure 1:
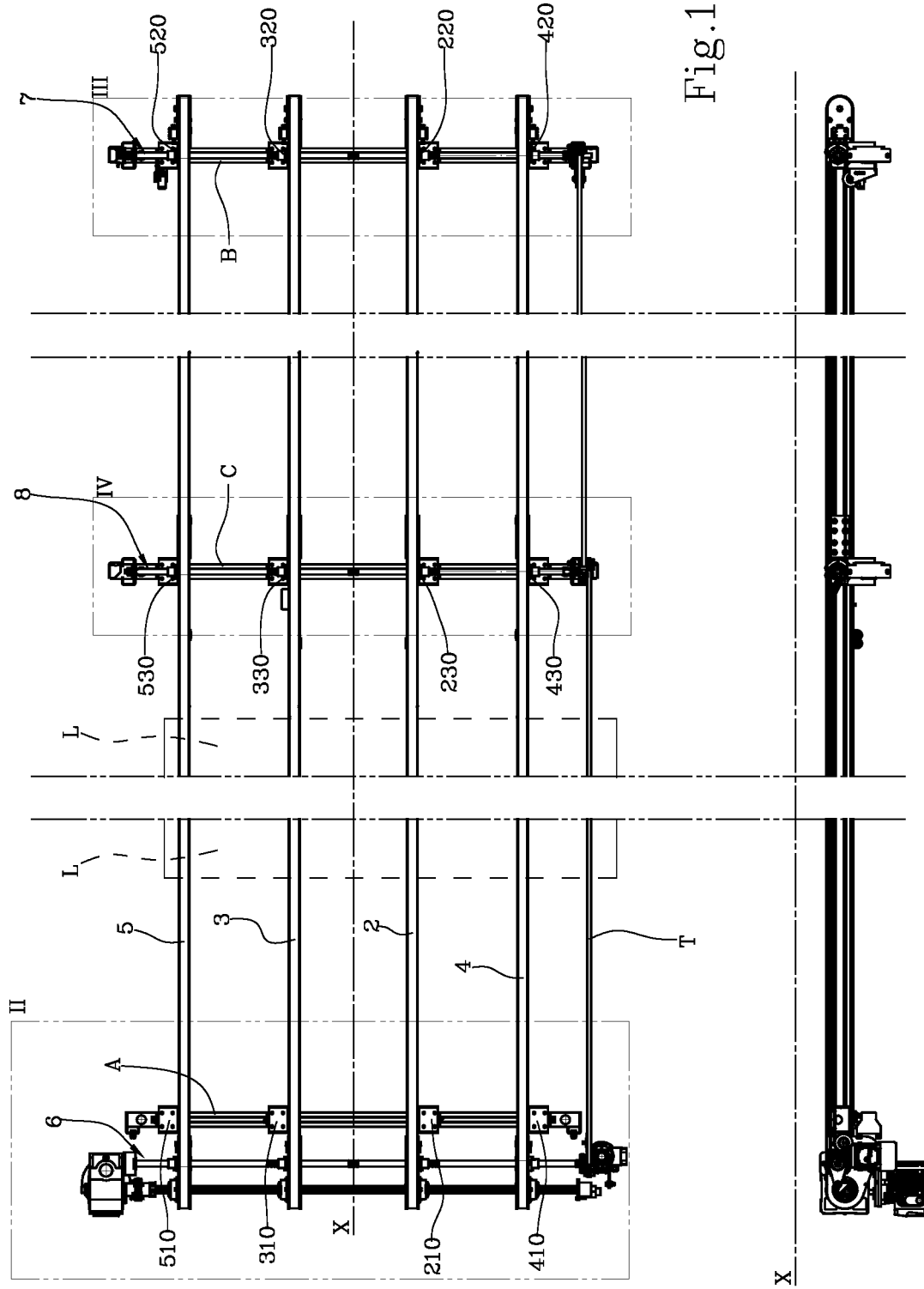
FIG. 1 is a top view of the transport device according to the present invention.

The device for the transport of ceramic slabs (L) according to the present invention comprises a pair of inner belts (2,3), parallel to a transport direction (x). The belts (2,3) are coplanar to each other, so as to define a substantially horizontal transport plane. Each inner belt (2,3) is associated to a respective support unit (210,220,310,320). Such support units comprise at least one front support (210,310) and at least one rear support (220,320), respectively.

The transport device further comprises a pair of outer belts (4,5), parallel to the transport direction (x) and coplanar to the transport plane. In substance, also the outer belts (4,5) are coplanar to each other and coplanar to the transport plane defined by the inner belts (2,3). Furthermore, the outer belts (4,5) and the inner belts (2,3) are parallel to one another. The outer belts (4,5) are located on opposite sides with respect to the pair of inner belts (2,3), i.e. the pair of inner belts (2,3) is interposed between the two outer belts (4,5). Each outer belt (4,5) is associated to a respective support unit (410,420,510,520). Such support units comprise at least one front support (410,510) and at least one rear support (420,520), respectively.

The inner belts (2,3) and the outer belts (4,5) are arranged symmetrically with respect to a vertical median plane parallel to the transport direction (x). In particular, both the belts of the pair of inner belts (2,3) and the belts of the pair of outer belts (4,5) are arranged symmetrically with respect to the vertical median plane parallel to the transport direction (x).

In the embodiment shown, each inner belt (2,3) is mounted on a respective front pulley (21,31) and on a respective rear pulley (22,32). In a known way, each belt (2,3) is closed in a loop arrangement around at least the front pulley (21,31) thereof and the rear pulley (22,32) thereof. Such pulleys rotate about axes perpendicular to the transport direction (X) and parallel to the transport plane.

In the embodiment shown, each outer belt is mounted on a front pulley (41,51) and on a rear pulley (42,52) rotating about axes perpendicular to the transport direction (X) and parallel to the transport plane. In substance, like the inner belts (2,3) each outer pulley (4,5) is closed in a loop arrangement around at least the front pulley (41,51) thereof and the rear pulley (42,52) thereof. Such pulleys rotate about axes perpendicular to the transport direction (X) and parallel to the transport plane.

Each belt therefore has an upper section, suitable to support the tiles, slidably movable along the transport direction (X), in an advancement direction. Each belt further has a lower section which, overall, moves in the opposite direction with respect to the upper section.

Figure 2:
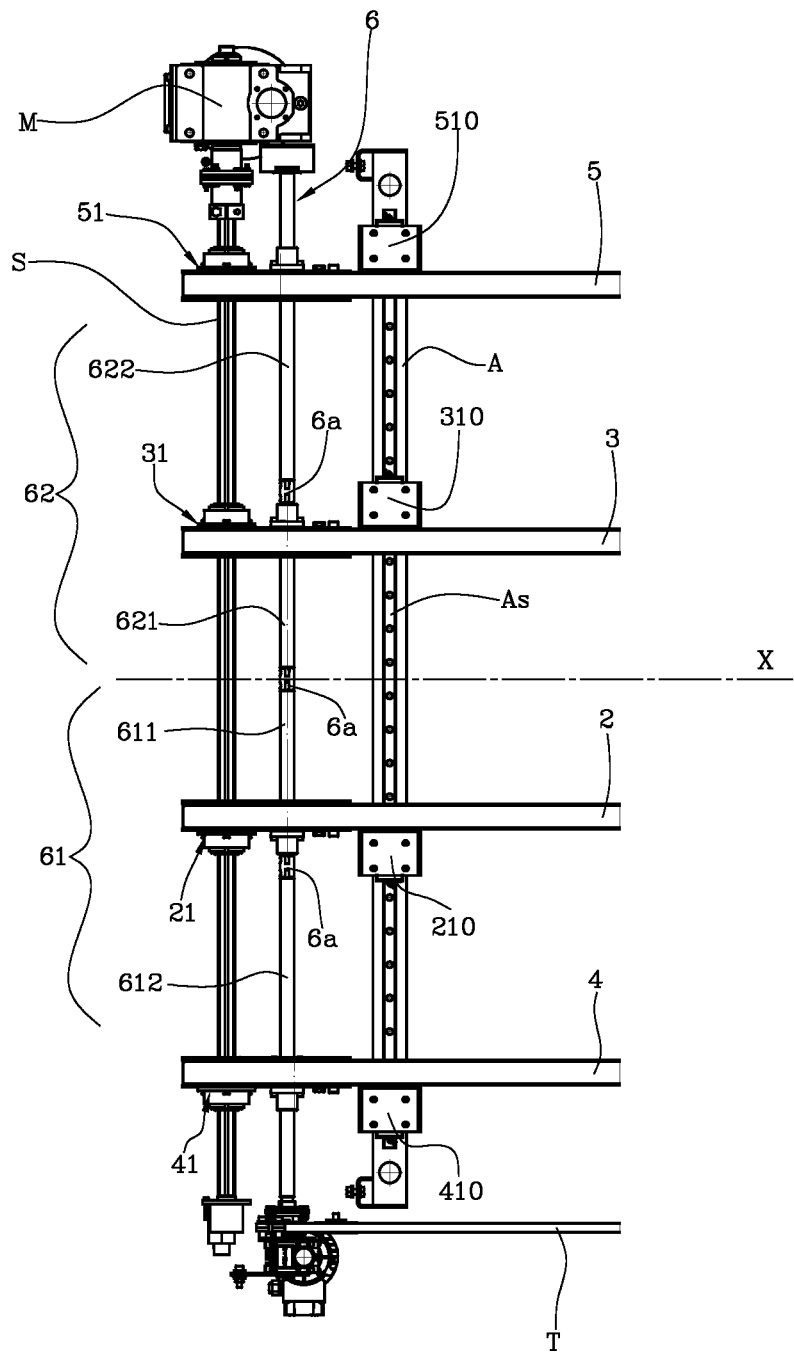
FIG. 2 shows the area II of FIG. 1 in an enlarged scale.
Figure 3:
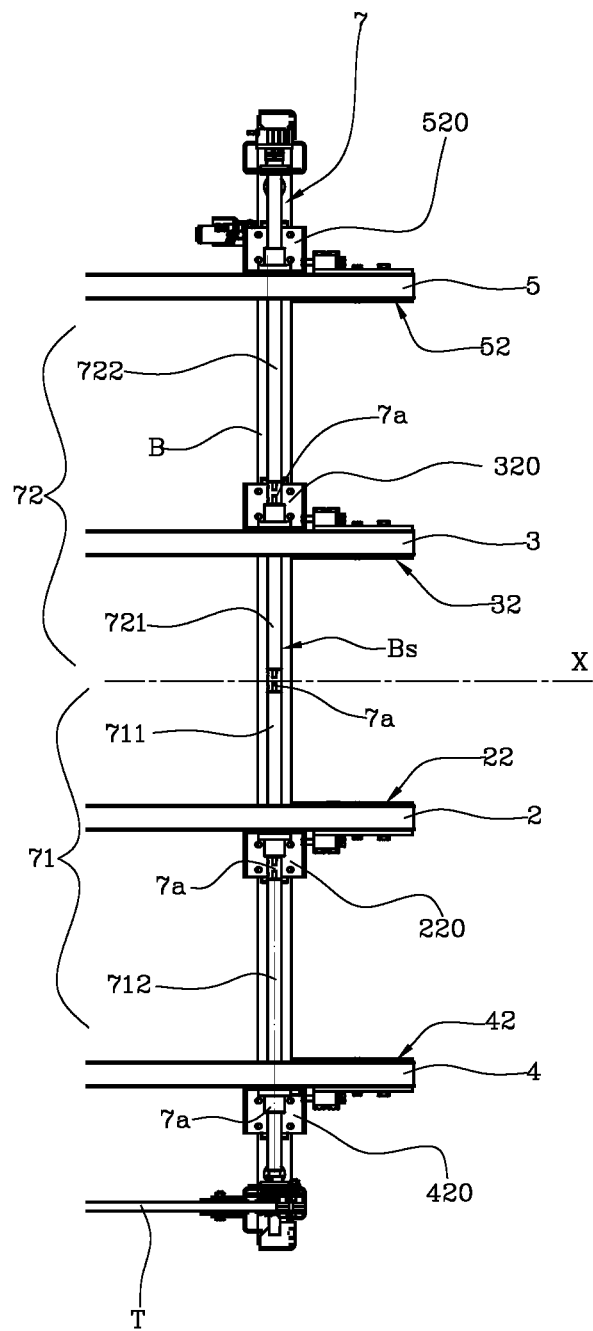
FIG. 3 shows the area III of FIG. 1 in an enlarged scale.
Figure 4:
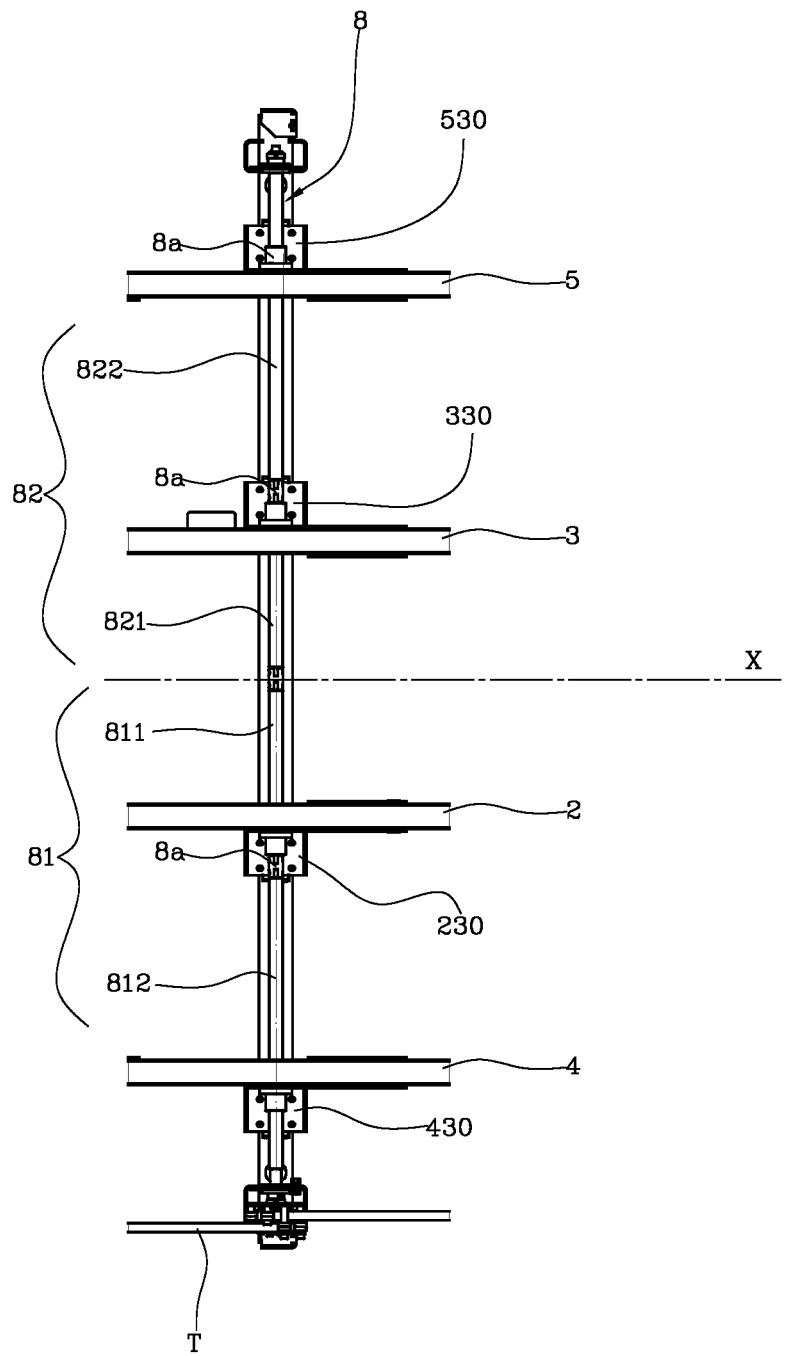
FIG. 4 shows the area IV of FIG. 1 in an enlarged scale.

At least one from among the groups of front pulleys is motorised, to enable the sliding of the belts (2,3,4,5). For example, the front pulleys (21,31,41,51) are mounted on a drive shaft (S), visible in FIG. 2, which is associated to a motor (M), creating a motorisation system that is well known in the sector. The activation of the motor (M) causes the belts (2,3,4,5) to slide along the paths thereof.

In the preferred but not exclusive embodiment shown, each front pulley (21,31,41,51) is associated to a respective front support (210,310,410,510) and each rear pulley (22,32,42,52) is associated to a respective rear support (220,320,420,520). Such front and rear supports are, in turn, associated to a support frame of the device, of which only two cross-members (A,B) are shown.

Advantageously, the front supports (210,310,410,510) are slidably associated to a front bar (6), arranged perpendicular to a transport direction (X) and parallel to the transport plane.

The front bar (6) comprises a first threaded portion (61) and a second threaded portion (62). The threads of the first portion (61) and of the second portion (62) have opposite screwing directions.

The front supports (210,410) of an inner belt (2) and of an outer belt (4) arranged on the same side with respect to the median plane of the device are associated, with a threaded coupling, to the first portion (61) of the front bar (6). The front supports (310,510) of the other inner belt (3) and of the other outer belt (5) are associated, with a threaded coupling, with the second portion (62) of the front bar (6).

In other words, the front support (210) of a first inner belt (2) is associated to the first portion (61) of the front bar (6), whereas the front support (310) of the second inner belt (3) is associated to the second portion (62) of the front bar (6).

In the same way, the front support (410) of a first outer belt (4) is associated to the first portion (61) of the front bar (6), whereas the front support (510) of the second outer belt (5) is associated to the second portion (62) of the front bar (6).

In this way, the rotation of the front bar (6) results in a simultaneous displacement of all the front supports, in opposite directions for the front supports (210,410) coupled to the first portion (61) with respect to the front supports (310,510) coupled to the second portion (62).

In other words, the two portions (61,62) of the front bar (6) made with opposite threads, enable the two belts of the pair of inner belts (2,3) and the two belts of the pair of outer belts (4,5) to be moved away from or towards each other simultaneously, through the rotation of the front bar (6). In this way, also by increasing the distance between the belts of each of the pairs of inner belts (2,3) and outer belts (4,5), to adapt the transport plane to larger slabs, it is possible to maintain a uniform distribution of the resting weight.

A motor means is predisposed to activate the front bar (6) in rotation, so as to displace the front supports (210,310, 410,510), in the ways described above, in a perpendicular direction to the transport direction (X) and parallel to the transport plane. The motor means is able to activate the rotation of the front bar (6) in both rotation senses, to cause the nearing or distancing of the belts (2,3,4,5).

Preferably, the first portion (61) and the second portion (62) respectively comprise a first section (611,621) and a second section (612,622) with threads having a different pitch. The front supports (210,310) of the inner belts (2,3) are coupled to first sections (611,621) of the first portion (61) and of the second portion (62). The front supports (410,510) of the outer belts (4,5) are coupled to second sections (612,622) of the first portion (61) and of the second portion (62).

In practice, the front support (210) of the first inner belt (2) is associated to the first section (611) of the first portion (61), whereas the front support (310) of the second inner belt (3) is associated to the second section (621) of the second portion (62).

In the same way, the front support (410) of the first outer belt (4) is associated to the second section (612) of the first portion (61), whereas the front support (510) of the second outer belt (5) is associated to the second section (622) of the second portion (62).

In this way, as well as causing the simultaneous displacement of all the front supports, in opposite directions for the front supports (210,410) coupled to the first portion (61) with respect to the front supports (310,510) coupled to the second portion, the rotation of the front bar (6) also produces different length displacements between the front supports (210,310) of the inner belts (2,3) and the front supports (410,510) of the outer belts (4,5).

Preferably, the pitch of each second section (612,622) is greater than the pitch of the first section (611,621). In other words, the rotation of the front bar (6) enables the two belts of the pair of inner belts (2,3) and the two belts of the pair of outer belts (4,5) to be moved away from or towards each other simultaneously, for strokes of different lengths. In particular, the distancing strokes performed by the outer belts (4,5) are larger than the distancing strokes performed by the inner belts (2,3). In the event of large format ceramic slabs, the outer belts (4,5) are therefore located closer to the edges of the slabs, making the distribution of the resting weight of the slabs more uniform. The front supports (210, 310,410,510) are slidably associated to the support frame of the transport device. In the embodiment shown, the front supports are associated to the front cross member (A) by means of a sliding guide (As), oriented parallel to the transport plane and perpendicular to the transport direction (x). In substance, the sliding guide of the front supports (210,310,410,510) is parallel to the axis of rotation of the front bar (6).

For each belt (2,3,4,5), a connection means is provided to connect the front supports (210,310,410,510) and the rear supports (220,320,420,520) to one another. Such connection means is structured so that each rear support follows the front support of the same belt in the displacements caused by the front bar (6).

In the preferred but not exclusive embodiment shown, the rear supports (220,320,420,520) are slidably associated to a rear bar (7), arranged parallel to the front bar (6), i.e. perpendicular to the transport direction (X) and parallel to the transport plane.

The rear bar (7) comprises a first threaded portion (71) and a second threaded portion (72). The threads of the first portion (71) and of the second portion (72) have opposite screwing directions. The threads of the rear bar (7) are exactly the same as the threads of the front bar (6).

The rear supports (220,420) of an inner belt (2) and of an outer belt (4) arranged on the same side with respect to the median plane of the device are associated, with a threaded coupling, to the first portion (71) of the second bar (7). The rear supports (320,520) of the other inner belt (3) and of the other outer belt (5) are associated, with a threaded coupling, to the second portion (72) of the rear bar (7).

In other words, the rear support (220) of a first inner belt (2) is associated to the first portion (71) of the rear bar (7), whereas the rear support (320) of the second inner belt (3) is associated to the second portion (72) of the rear bar (7).

In the same way, the rear support (420) of a first outer belt (4) is associated to the first portion (71) of the rear bar (7), whereas the rear support (520) of the second outer belt (5) is associated to the second portion (72) of the rear bar (7).

In this way, the rotation of the rear bar (6), which is simultaneous to the rotation of the front bar (6), produces a simultaneous displacement of all the rear supports, in opposite directions for the rear supports (220,420) coupled to the first portion (71) with respect to the rear supports (320,520) coupled to the second portion (72). The rear supports are displaced simultaneously while maintaining the alignment with the front supports.

In the embodiment in which the first portion (61) and the second portion (62) of the front bar (6) respectively comprise a first section (611,621) and a second section (612,622) with threads having a different pitch, also the first portion (71) and the second portion (72) respectively comprise a first section (711,721) and a second section (712,722) with threads having a different pitch. The threads of the first portion (71) and of the second portion (62) of the rear bar (6) are the same as the threads of the first portion (61) and of the second portion (62) of the front bar (6). In that case, if the same solution is adopted for the front bar (6), the pitch of each second section (712,722) is greater than the pitch of the first section (711,721).

A motor means is predisposed to activate the rear bar (7) in rotation, so as to displace the rear supports (220,320,420, 520) along the rear bar (7), in a perpendicular direction to the transport direction (X) and parallel to the transport plane. The motor means for the rotation of the rear bar (7) may be dedicated to the rear bar (7) itself, or may be in common with the front bar (6). In other words, a single rotary actuator, for example an electric motor, can be connected to the front bar (6) and to the rear bar (7), for example by means of a transmission belt (T) associated to toothed wheels solidly constrained to corresponding ends of the bars (6,7).

In an advantageous embodiment, the front bar (6) is formed by two or more parts, rigidly connected to one another at joints (6a). Each joint (6a) is structured to removably constrain two adjacent portions of the front bar (6). Various joint solutions are known to a person skilled in the art, and will not be described in further detail. The possibility of disconnecting one or more parts of the front bar (6) substantially enables an access to be created for removing or mounting a belt (2,3,4,5). Preferably, the joints (6a) are located in proximity to the front supports (210,310, 410,510). This facilitates the dismounting of the various belts (2,3,4,5).

In the same way, also the rear bar (7) can be made in two or more parts, rigidly connected to one another at joints (7a). Each joint (7a) is structured to removably constrain two adjacent portions of the rear bar (7), in the same way as the solution described for the front bar (6), and for the same purposes of facilitating the dismounting and remounting of the belts (2,3,4,5). Like with the front bar (6), the joints (7a) are preferably located in proximity to the rear supports (220,320,420,520).

In a possible embodiment, the support units of each belt (2,3,4,5) can be provided with intermediate supports (230, 330,430,530) located between the front supports (210,310, 410,510) and the rear supports (220,320,420,520). Such intermediate supports are associated to the respective belt (2,3,4,5) in an intermediate area, for supporting the respective belt especially in the case in which it has a greater length.

In the preferred but not exclusive embodiment shown, the intermediate supports are slidably associated to an intermediate bar (8), arranged parallel to the front bar (6) and to the rear bar (7), i.e. perpendicular to the transport direction (X) and parallel to the transport plane.

The intermediate bar (8) comprises a first threaded portion (81) and a second threaded portion (82). The threads of the first portion (81) and of the second portion (82) have opposite screwing directions. The threads of the intermediate bar (8) are exactly the same as the threads of the front bar (6) and of the rear bar (7).

The intermediate supports of an inner belt (2) and of an outer belt (4) arranged on the same side with respect to the median plane of the device are associated, with a threaded coupling, to the first portion (81) of the intermediate bar. The intermediate supports of the other inner belt (3) and of the other outer belt (5) are associated, with a threaded coupling, to the second portion (82) of the intermediate bar.

In other words, the intermediate support of a first inner belt (2) is associated to the first portion (81) of the intermediate bar, whereas the intermediate support of the second inner belt (3) is associated to the second portion (82) of the intermediate bar (8).

In the same way, the rear support (430) of a first outer belt (4) is associated to the first portion (81) of the intermediate bar (8), whereas the rear support (530) of the second outer belt (5) is associated to the second portion (82) of the intermediate bar (8).

In this way, the rotation of the intermediate bar (8), which is simultaneous to the rotation of the front bar (6) and of the rear bar (7), produces a simultaneous displacement of all the intermediate supports, in opposite directions for the intermediate supports coupled to the first portion (81) with respect to the intermediate supports coupled to the second portion (82). The intermediate supports are displaced simultaneously and maintaining the alignment with the front supports and the rear supports.

In the embodiment in which the first portion (61) and the second portion (62) of the front bar (6) and the first portion (71) and the second portion (72) of the rear bar (7) respectively comprise a first section (611,621,711,721) and a second section (612,622,712,722) with threads having a different pitch, also the first portion (81) and the second portion (82) of the intermediate bar (8) respectively comprise a first section (811,821) and a second section (812,822) with threads having a different pitch. The threads of the first portion (81) and of the second portion (82) of the intermediate bar (8) are the same as the threads of the first portion (61) and of the second portion (62) of the front bar (6) and the threads of the first portion (71) and the second portion (72) of the rear bar (7).

A motor means is predisposed to activate the intermediate bar (8) in rotation, so as to displace the intermediate supports along the intermediate bar (8), in a perpendicular direction to the transport direction (X) and parallel to the transport plane. The motor means for the rotation of the intermediate bar (8) may be dedicated to the intermediate bar (8), or may be in common with the front bar (6) and/or with the rear bar (7). In other words, a single rotary actuator, for example an electric motor, can be connected to the front bar (6), to the rear bar (7) and to the intermediate bar (8), for example by means of a transmission belt (T) associated to toothed wheels solidly constrained to corresponding ends of the bars (6,7,8).

Also the intermediate bar (8) can be made in two or more parts, rigidly connected to one another at joints (8a). Each joint (8a) is structured to rigidly constrain two adjacent portions of the intermediate bar (8), in the same way as the solution described for the front bar (6) and for the rear bar (7), and for the same purposes of facilitating the dismounting and remounting of the belts (2,3,4,5). The joints (8a) are preferably located in proximity to the intermediate supports (230,330,430,530).

The invention claimed is:

1. A device for the transport of ceramic slabs (L), comprising:
   a pair of inner belts (2,3), parallel to a transport direction (x) and coplanar to a transport plane, each of which is associated to a respective support unit (210,220,310, 320);
   a pair of outer belts (4,5), parallel to a transport direction (x) and coplanar to the transport plane, each of which is associated to a respective support unit (410,420,510, 520);
   wherein the pair of inner belts (2,3) is interposed between the two outer belts (4,5);
   characterised in that:
   front supports (210,310,410,510) of the belts (2,3,4,5) are slidably associated to a front bar (6), arranged perpendicular to a transport direction (X) and parallel to the transport plane;
   the front bar (6) comprises a first threaded portion (61) and a second threaded portion (62), in which the threads of the first portion (61) and of the second portion (62) are screwable in opposite directions, wherein the first threaded portion (61) and the second threaded portion (62) respectively comprise a first section (611,621) and a second section (612,622) with threads having a different pitch;

the front supports (210,410) of an inner belt (2) and of an outer belt (4) are associated, by a threaded coupling, to the first portion (61) of the front bar (6);

the front supports (310,510) of the other inner belt (3) and of the other outer belt (5) are associated, by a threaded coupling, to the second portion (62) of the front bar (6); and motor means is predisposed to activate the front bar (6) in rotation, so as to displace the front supports (210,310, 410,510) along the front bar (6), in a perpendicular direction with respect to the transport direction (X) and parallel to the transport plane.

2. The transport device according to claim 1, wherein the pitch of each second section (612,622) is greater than the pitch of the first section (611,621).

3. The transport device according to claim 1, wherein:

rear supports (220,320,420,520) are slidably associated to a rear bar (7), arranged parallel to the front bar (6) and perpendicular to the transport direction (X) and parallel to the transport plane;

the rear bar (7) comprises a first threaded portion (71) and a second threaded portion (72), wherein the threads of the first portion (71) and of the second portion (72) have opposite screwing directions;

the rear supports (220,420) of an inner belt (2) and of an outer belt (4) are associated, by a threaded coupling, to the first portion (71) of the second bar (7);

the rear supports (320,520) of the other inner belt (3) and of the other outer belt (5) are associated, by a threaded coupling, to the second portion (72) of the rear bar (7); and motor means is predisposed to activate the rear bar (7) in rotation, so as to displace the rear supports (220,320, 420,520) along the rear bar (7), in a perpendicular direction with respect to the transport direction (X) and parallel to the transport plane.

4. The transport device according to claim 3, wherein the first threaded portion (71) of the rear bar and the second threaded portion (72) of the rear bar comprise, respectively, a first section (711,721) and a second section (712,722) with threads having a different pitch.

5. The transport device according to claim 4, wherein the pitch of each second section (712,722) is greater than the pitch of the first section (711,721).

6. The transport device according to claim 1, wherein:

each inner belt (2,3) is mounted on a front pulley (21,31) and on a rear pulley (22,32) rotating about axes perpendicular to the transport direction (X) and parallel to the transport plane;

each outer belt (4,5) is mounted on a front pulley (41,51) and on a rear pulley (42,52) rotating about axes perpendicular to the transport direction (X) and parallel to the transport plane; and each front pulley (21,31,41,51) is associated to a respective front support (210,310,410,510) and each rear pulley (22,32,42,52) is associated to a respective rear support (220,320,420,520).

7. The device according to claim 4, wherein the support units of each belt (2,3,4,5) comprise intermediate supports (230,330,430,530) located between the front supports (210, 310,410,510) and the rear supports (220,320,420,520).

8. The device according to claim 7, wherein the intermediate supports are slidably associated to an intermediate bar (8), arranged parallel to the front bar (6) and to the rear bar (7) and perpendicular to the transport direction (X) and parallel to the transport plane.

9. The device according to claim 8, wherein the intermediate bar (8) comprises a first threaded portion (81) and a second threaded portion (82), the threads of which are identical to the threads of the first portion (61) and of the second portion (62) of the front bar (6).

10. The device according to claim 1, wherein the front bar (6) is formed by two or more parts, rigidly connected to one another at joints (6*a*), each of which is structured to removably constrain two adjacent portions of the front bar (6).

11. The device according to claim 1, wherein the rear bar (7) is formed by two or more parts, rigidly connected to one another at joints (7*a*), each of which is structured to removably constrain two adjacent portions of the rear bar (7).

* * * * *